United States Patent Office 3,555,829
Patented Jan. 19, 1971

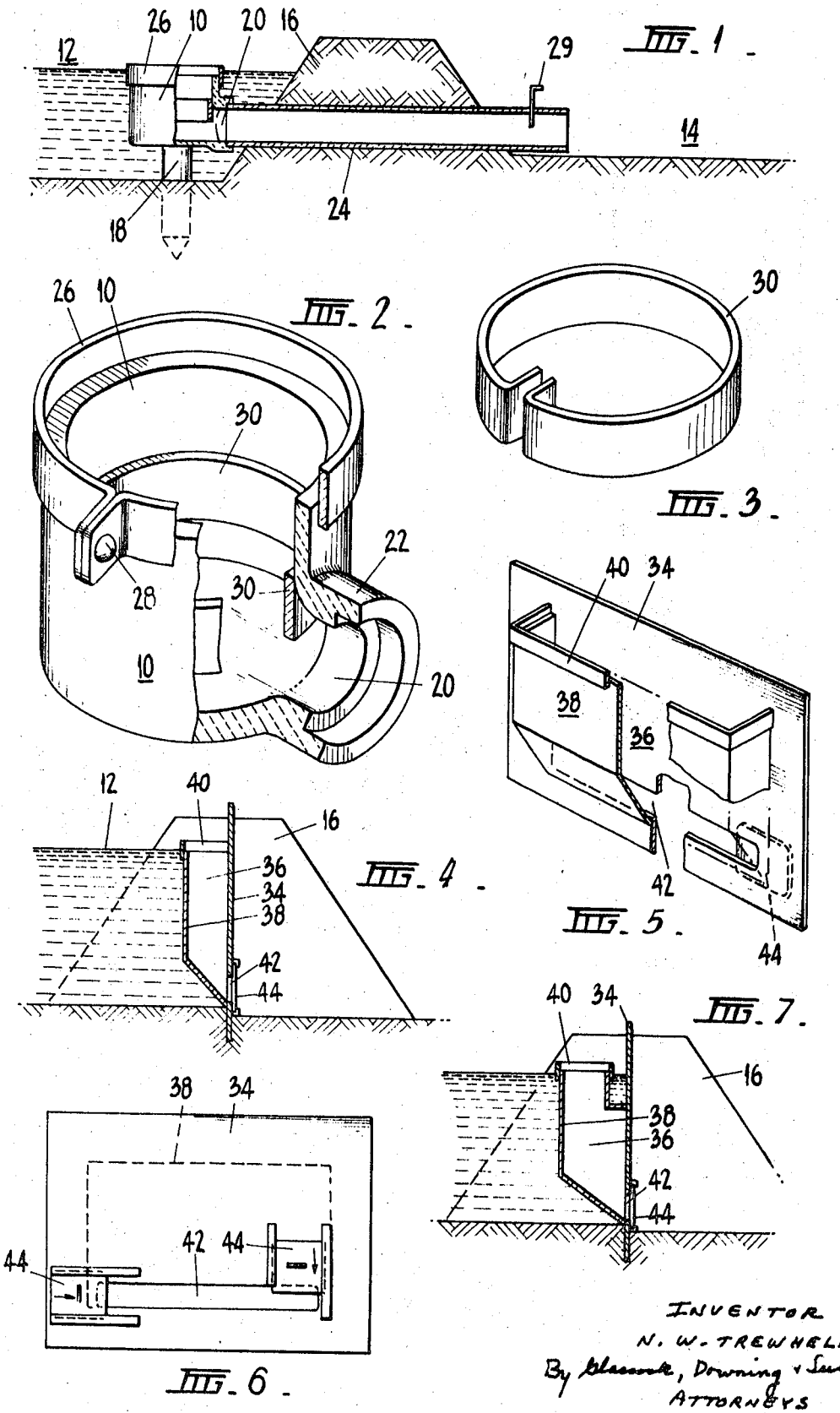

3,555,829
OVERFLOW DISCHARGE OUTLETS AND IRRIGATION SYSTEMS INCORPORATING THE SAME
Neil William Trewhella, Kyneton, Victoria, Australia, assignor to The State Rivers and Water Supply Commission, Armadale, Victoria, Australia, a body corporate of Victoria
Filed Sept. 23, 1968, Ser. No. 761,634
Claims priority, application Australia, Sept. 26, 1967, 27,713/67; May 17, 1968, 37,970/68
Int. Cl. E02b 9/02
U.S. Cl. 61—17        4 Claims

ABSTRACT OF THE DISCLOSURE

Improved overflow discharge outlets which are especially suitable for the discharge of water from irrigation channels.

The outlet comprises a body formed with an upstanding passage having its upper end defined by a horizontal overflow lip which may extend either completely or only partly about the passage for the inflow of water into the latter from the channel. The overflow lip is preferably formed by the upper edge of a vertically adjustable upward extension of the body.

Water is discharged from a lower part of the passage through an opening in the body, and the rate of flow through this opening is restricted by a valve, baffle or other means to prevent wastage of water if the level of the water in the channel should rise excessively above the level of the overflow lip.

One form of the outlet is adapted to be arranged within a channel while another form is adapted to be arranged in a channel bank to close a gap formed therein.

BACKGROUND OF THE INVENTION

This invention relates to overflow discharge outlets suitable among other things for use in flood irrigation systems and to irrigation systems incorporating such outlets.

In flood irrigation systems, it is the usual practice to subdivide the area, along the length of one side at least of a head channel, into a plurality of successive bays which slope outwardly and downwardly from the channel, and which usually are disposed approximately transversely with respect thereto. Water is discharged as required from the channel into the several bays or groups of bays in sequence through suitable bay outlets arranged at required intervals along the length of the channel.

In one known system of irrigation, which may be used for successive downstream or successive upstream irrigation of the bays, the bay outlets are of the permanently open overflow type, and a so-called channel check or gate is arranged transversely in the channel between each adjacent pair of bays or bay groups. The channel checks used for this purpose may advantageously be of the overflow or weir type in order that when closed each such check will maintain a predetermined level of water at its upstream side.

When a system of this kind is used for successive downstream irrigation of the bays extending along the length of a head channel, all of the channel checks are initially closed, so that when water is permitted to pass into the head channel from a supply channel, it flows into the first section only of the former, as its further progress is prevented by the first of the closed channel checks.

Each of the spaced, permanently open bay outlets may consist of a plate formed with a rectangular discharge opening the bottom of which serves as an overflow sill, and the sills of all of the outlets in each bay, or in all bays of a group which are to be simultaneously watered, are disposed substantially at the same level.

Thus, when the water entering the first channel section rises above the level of the overflow sills of the open bay outlets in that section, it commences to discharge through the several outlets into the corresponding bay or bay group.

After the first bay or bay group has been sufficiently watered, the first channel check is opened, either manually or automatically, to enable the water to flow into the next succeeding or second channel section, the downstream end of which is at this time closed by the second channel check. The level of the water in the first section of the channel drops below the level of the bay outlets therein when the first channel check is opened, but when the advancing water front reaches the closed second channel check, the water level then commences to rise again and this continues until it rises above the level of the overflow sills of the bay outlets in the second section of the channel. The overflow sills of these bay outlets in the second channel section are below the level of the overflow sills in the first section so that the level does not rise high enough to discharge into the bays previously watered. After the second group of bays has been watered, the second channel check is opened so that the water flows into the third channel section and overflows into the corresponding bay groups and so on successively in the downstream direction.

It will be evident that the procedure would be reversed for successive upstream irrigation, for which purposes all of the channel checks are initially open and are then successively closed in the upstream direction.

The above described method of irrigation, however, presents difficulties when, as is commonly the case in certain irrigation areas in Australia for example, the fall along the length of the head channel is very small so that the difference in the height of the overflow sills of successive bays or bay groups may be as small as say, one half of an inch.

In such circumstances, it is necessary for the overflow sills or lips to be arranged accurately at the required height and also to be capable of discharging water at a required rate when the head of water over the sills is of the order of one half of an inch. Thus, outlets of the aforesaid kind require to be of considerable width and this increases their cost and the difficulty of installing them accurately. Also, small differences in water level considerably change the discharge rate with consequent risk of either inadequate irrigation of wastage of water.

It is therefore an object of this invention to provide improved overflow discharge outlets for the aforesaid and other like purposes.

SUMMARY OF THE INVENTION

Accordingly, the invention provides an overflow discharge outlet adapted to be arranged within an irrigation channel or the like and comprising a body formed with an upstanding passage having its upper end defined at least partly by an overflow lip for the inflow of water into said passage, an opening for the discharge of water from a lower portion of said passage, and means whereby the flow of water through said discharge opening is restricted.

More particularly the overflow lip may extend either wholly, or only partly, around the perimeter of the upper end of the passage and the ength of said lip is such as to provide a required discharge rate when the head of water in the channel above the lip has a predetermined minimum value.

Preferably, the overflow lip is formed by the upper edge of an extension member which is adjustable upwardly and downwardly in order that the lip may be raised and lowered within suitable limits.

The means for restricting the discharge of water through the outlet may comprise a discharge pipe of a suitable diameter and length and this pipe may be provided with a suitable flow regulating valve. Alternatively, one or more adjustable plates or other members may be provided to enable the effective area of the discharge opening to be adjusted.

According to a preferred form of the invention, the discharge outlet is adapted for installation within a channel and comprises a substantially vertically disposed hollow body having its upper end open and disposed in a horizontal plane, and a discharge pipe connecting with and extending laterally from a lower part of said body.

Another form of discharge outlet according to the invention comprises a barrier member adapted to be set in a channel bank so as to extend across and close a gap formed therein, said barrier member being formed with an upstanding discharge passage having its upper end defined by an overflow lip or sill which extends either wholly or only partly around the perimeter of the passage, and a discharge opening communicating with a lower part of said passage at the side thereof remote from the channel or the like. Adjustable means are preferably provided for regulating the effective area of the discharge opening.

The invention also includes an irrigation system comprising a channel defined between spaced banks and provided at spaced intervals along the length thereof with overflow discharge outlets as above set forth for the discharge of water outwardly of one at least of the banks.

In order that the invention may be more clearly understood, preferred forms thereof are hereinafter more fully described with reference to the accompanying drawings in which:

BRIEF DESCRIPTION OF THE DRAWINGS

FIG 1 is a view of one form of overflow discharge outlet according to the invention, arranged within an irrigation channel, FIG. 2 is a cut-away perspective view to a larger scale, of the body of the discharge outlet shown in FIG. 1, FIG. 3 is a perspective view of a baffle band, FIG. 4 is a view in sectional end elevation of another form of overflow discharge outlet according to the invention, FIG. 5 is a cut-away perspective view of the discharge outlet shown in FIG. 4, FIG. 6 is a view in elevation of the outer or discharge side of the outlet structure shown in FIGS. 4 and 5, and FIG. 7 is a view similar to FIG. 4 and shows a further modification of the invention.

The overflow discharge outlet shown in FIGS. 1 and 2 comprises a pot-like vessel 10 formed of concrete, earthenware or other suitable material such as asbestos cement or plastic, and which when in use is arranged within an irrigation channel 12 which is separated from a bay 14 by a bank 16.

This vessel 10 which preferably rests on a suitable support, such as a stake 18 driven into the channel bed, is provided near the bottom thereof with a lateral discharge opening 20 defining the inner end of the passage in a short hollow branch 22 formed integrally with the vessel and projecting laterally therefrom.

The outer end of the branch 22 is formed with a socket to receive the inner end of a pipe 24 which extends through the channel bank to discharge water into the bay 14. The pipe may, if desired, be integral with the vessel 10 especially if the latter is formed of plastic or other relatively light-weight material.

The upper end of the vessel 10 is encircled by a metal band 26 of a suitable width which has its adjacently opposite ends bent outwardly to form lugs to receive a clamping bolt 28. This band may therefore be raised and lowered through a small distance so as to regulate the level to which the water in the channel must rise before it commences to overflow into the vessel. Also this band 26 may be arranged so that its upper edge is disposed in a horizontal plane thus obviating the necessity for precision location of the vessel 10 itself.

Consequently when the water level rises above the upper edge of the band 26, it overflows into the vessel around the full circumference of the band 26. The rate of inflow for any particular head of water above the band 26 thus depends upon the diameter of the latter, so that the diameter of the vessel 10 is selected so that a required rate of inflow is obtained when the level of the water is disposed at a minimum predetermined height, e.g. one half of an inch, above the overflow lip constituted by the upper edge of the band.

It is of course necessary for the pipe 24 to be capable of discharging the water at the required predetermined rate, and this consideration determines its minimum internal diameter.

In this connection it will be apparent that if the diameter and length of the discharge pipe are so selected that the latter is just full of water when discharging at the predetermined flow rate, an increase in the head level will not greatly increase the discharge rate, that is to say the self-throttling effect of the discharge pipe will tend to maintain the discharge rate substantially constant after the pipe commences to discharge at its full capacity.

However, in order to allow for unavoidable variations in the diameters and surface characteristics of different pipes and the differing requirements of individual installations it is generally necessary or desirable to use a pipe 24 which is not discharging at its full capacity when there is a predetermined minimum head of water above the overflow lip, and in such circumstances an adjustable valve, baffle or the like, is provided to permit of regulation of the discharge rate, such as by providing a simple radially arranged slide plate 29 in the outer end portion of the discharge pipe, as shown in FIG. 1, so that the passage may be obstructed to any required extent.

Alternatively, means may be provided for partly obstructing the outlet opening 20 in the vessel 10, and as shown in FIGS. 2 and 3, such means may comprise an interrupted resilient band 30 arranged circumferentially within the vessel 10, and which, due to its resilience, frictionally grips the interior surface thereof. This band may thus be arranged so as to obstruct the opening 20 to any required extent.

It will, however, be understood that once the valve or baffle has been adjusted to suit the requirements of the particular installation in which it is to be used, it does not normally require further adjustment for the reason that as already explained, the device is largely self-regulating when the pipe is discharging at its full capacity for any particular setting of the valve or baffle.

The alternative type of overflow bay outlet shown in FIGS. 4 and 5 comprises a vertical barrier member in the form of a plate 34 which in use is embedded in bank 16 of the channel 12 so as to extend across a gap 17 formed in the bank. The barrier member may alternatively be formed of concrete or other suitable material.

This barrier plate forms the back of a vertically disposed hopper-like trough 36, the front and ends of which are formed by a further plate 38 secured to the front or inner side of the barrier plate. The upper edge of the plate 38 is disposed horizontally and may form the overflow lip for the discharge of water from the channel but, as in device shown in FIGS. 1 and 2, a correspondingly formed metal strip 40 is preferably adjustably mounted on the trough to permit of adjustment of the height of the lip and its arrangement in a horizontal plane.

The plate 34 is provided near the bottom of the trough with an elongated horizontally disposed slot 42, which forms the discharge opening, and horizontally or vertically adjustable plates 44 attached to the back of the barrier plate 34 enable the effective area of the slot to be adjusted to suit the required discharge rate as previously described.

In this device therefore, the overflow lip extends only around the front and ends of the trough, though again it is necessary for this lip to be of sufficient length to permit of the inflow of water at the required rate when the head of water in the channel has a predetermined minimum value.

An outlet device of the kind shown in FIGS. 4, 5 and 6 may, if desired, be so constructed, e.g. as shown in FIG. 7, so as to provide an overflow lip which extends continuously around the inflow opening.

I claim:

1. An overflow discharge outlet comprising a generally vertical hollow body which is open at its upper end and closed at its lower end, means movably mounted on an upper part of the body and forming a vertically adjustable upward extension of the wall thereof, said extension forming at its upper edge a horizontally disposed overflow lip which extends substantially completely about the passage for the inflow of water into the latter, a lateral discharge opening in the body adjacent the lower end, adjustable means operable to regulate the flow of water through said discharge opening, and said adjustable means, operable to regulate the flow of water through said discharge opening, including an interrupted resilient band arranged within and frictionally engaging the wall of the body whereby said band may be arranged so as partly to obstruct said discharge opening.

2. An overflow discharge outlet for the discharge of water from or close to the surface thereof in an irrigation channel or the like, comprising a substantially vertically disposed barrier member adapted to extend across and close a gap in a channel bank or the like, said barrier member being formed with an unstanding discharge passage, vertically adjustable means mounted on the barrier member, said adjustable means having an upper edge forming a substantially horizontally disposed overflow lip for the inflow of water into the upper portion of the upstanding passage, said overflow lip being at all times disposed below the level of the top of the barrier member, a discharge opening communicating with a lower part of said upstanding passage and valve means operable to regulate the flow of water through said discharge opening.

3. The overflow discharge outlet according to claim 2 wherein said overflow lip extends only partly around the perimeter of the said upstanding discharge passage.

4. The overflow discharge outlet according to claim 2 wherein said overflow lip is formed by the upper edge of a vertically adjustable member mounted on said barrier member.

References Cited

UNITED STATES PATENTS

| 1,650,711 | 11/1927 | Hatfield | 137—577 |
|---|---|---|---|
| 2,077,308 | 4/1937 | Bumpas et al. | 61—18 |

PETER M. CAUN, Primary Examiner

U.S. Cl. X.R.

61—18; 137—577